(12) United States Patent
Woodford et al.

(10) Patent No.: US 8,192,834 B2
(45) Date of Patent: Jun. 5, 2012

(54) PRODUCTION OF GLOVES AND OTHER ARTICLES OF FLEXIBLE POLYMER MATERIAL

(75) Inventors: James M. D. Woodford, Kuala Lumpur (MY); Loo Liong Yu, Selangor (MY)

(73) Assignee: Ansell Healthcare Products LLC, Red Bank, NJ (US)

( * ) Notice: Subject to any disclaimer, the term of this patent is extended or adjusted under 35 U.S.C. 154(b) by 15 days.

(21) Appl. No.: 12/645,569

(22) Filed: Dec. 23, 2009

(65) Prior Publication Data

US 2010/0095429 A1 Apr. 22, 2010

Related U.S. Application Data

(63) Continuation of application No. 11/390,709, filed on Mar. 28, 2006, now abandoned, which is a continuation of application No. 10/203,267, filed as application No. PCT/AU01/00125 on Feb. 8, 2001, now Pat. No. 7,048,884.

(30) Foreign Application Priority Data

Feb. 8, 2000 (MY) ............................. PI 20000428

(51) Int. Cl.
*B32B 3/26* (2006.01)
*B32B 9/00* (2006.01)
(52) U.S. Cl. ............... 428/304.4; 428/318.4; 428/318.6
(58) Field of Classification Search .............. 428/304.4, 428/318.4, 318.6
See application file for complete search history.

(56) References Cited

U.S. PATENT DOCUMENTS

| | | | |
|---|---|---|---|
| 1,814,473 A * | 7/1931 | Hauser et al. ................ 264/301 |
| 2,321,111 A | 6/1943 | Stamberger | |
| 2,324,735 A | 7/1943 | Spanel | |
| 3,608,053 A | 9/1971 | Agostinelli | |
| 3,890,261 A | 6/1975 | Fitzgerald | |
| 3,919,451 A * | 11/1975 | Levy et al. ................ 428/314.2 |
| 3,945,049 A | 3/1976 | Barlow | |
| 3,968,285 A | 7/1976 | Coffin et al. | |
| 3,998,772 A | 12/1976 | Beerbower et al. | |
| 4,373,033 A | 2/1983 | Gupta | |
| 4,515,851 A | 5/1985 | Johnson | |
| 4,519,098 A | 5/1985 | Dunmire et al. | |
| 4,776,992 A | 10/1988 | Irving et al. | |
| 4,923,920 A | 5/1990 | Scholl et al. | |
| 5,084,514 A | 1/1992 | Szczechura et al. | |
| 5,138,719 A | 8/1992 | Orlianges et al. | |
| 5,284,607 A | 2/1994 | Chen | |
| 5,304,337 A | 4/1994 | Chen et al. | |
| 5,332,621 A | 7/1994 | Schmidt et al. | |
| 5,859,076 A | 1/1999 | Kozma et al. | |
| 5,998,540 A | 12/1999 | Lipkin et al. | |
| 6,280,673 B1 | 8/2001 | Green et al. | |
| 6,347,409 B1 | 2/2002 | Nile et al. | |
| 6,527,990 B2 | 3/2003 | Yamashita et al. | |
| 6,576,633 B1 * | 6/2003 | Young et al. ................ 514/244 |
| 7,048,884 B2 | 5/2006 | Woodford et al. | |
| 2007/0136926 A1 | 6/2007 | Johnson et al. | |

FOREIGN PATENT DOCUMENTS

| | | |
|---|---|---|
| DE | 19708451 | 9/1998 |
| EP | 0543657 | 5/1993 |
| EP | 0849325 | 6/1998 |
| JP | 61-275406 | 12/1986 |
| JP | 03161501 | 7/1991 |
| JP | 09-310209 | 12/1997 |
| WO | WO-96/23428 | 8/1996 |
| WO | WO-99/20203 | 4/1999 |

OTHER PUBLICATIONS

"International Preliminary Examination Report", PCT/AU01/00125, Aug. 21, 2001, 3.
"PCT International Search Report", PCT/AU01/00125, Apr. 18, 2001, 2.

* cited by examiner

*Primary Examiner* — Victor Chang
(74) *Attorney, Agent, or Firm* — Moser Taboada

(57) ABSTRACT

A process for producing an article in a flexible foamed polymer material, including treating a former with a coagulant; dipping the treated former in a latex foam mixture to form a layer of the mixture on the former that includes air cells; curing the layer to gel the foam mixture to a cross-linked open cell structure; and stripping the layer from the former; where the latex foam mixture includes a natural latex polymer as a primary polymer component, and a synthetic latex polymer as a secondary polymer component, which synthetic latex polymer is selected to enhance the evenness and/or fineness of said open cell structure.

17 Claims, No Drawings

PRODUCTION OF GLOVES AND OTHER ARTICLES OF FLEXIBLE POLYMER MATERIAL

STATEMENT OF RELATED CASES

This application is a continuation of U.S. application Ser. No. 11/390,709 filed Mar. 28, 2006, now abandoned, which is a continuation of U.S. application Ser. No. 10/203,267 filed Nov. 13, 2002, now U.S. Pat. No. 7,048,884, which is a national stage entry of PCT/AU01/00125 filed Feb. 8, 2001, the contents of which are incorporated by reference herein in their entirety.

FIELD OF THE INVENTION

This invention relates generally to the manufacture of articles in a flexible foamed polymer material. The invention is particularly useful in the production of articles such as gloves in foam lined natural or synthetic latex, and in one aspect further relates to a novel latex foam glove.

BACKGROUND

A variety of latex compositions including natural and synthetic rubbers are disclosed in U.S. Pat. Nos. 3,968,285, 4,373,033, 5,332,621 and 5,084,514. U.S. Pat. No. 4,373,033 discloses a blend of high styrene resin, natural rubber and latex. U.S. Pat. No. 5,332,621 discloses a latex comprising 20-100% by weight of SBR latex, with a minimum proportion of more than 15% by weight of styrene, and 80-0% by weight of natural rubber latex or other synthetic latexes. U.S. Pat. No. 5,084,514 relates to the manufacture of gloves. For the purpose of obtaining what the reference describes as excellent donning and doffing characteristics, the latex includes a carboxylated latex terpolymer of butadiene/acrylonitrile methacrylate, and preferably another component selected from a wide range of synthetic and natural rubbers.

It is a general objective of the present invention to provide a new process of making a glove and to provide a new glove to achieve improvements in the process itself and/or in the end product.

SUMMARY

In a first aspect of the invention, it has been discovered that if the latex polymer components of the latex foam mixture include a natural latex polymer as a primary component and a synthetic latex such as an acrylic terpolymer or polyurethane polymer as a secondary component, significant benefits can be obtained in the open cell structure of the final latex foam layer.

In accordance with the first aspect of the invention, therefore, there is provided a process for producing an article in a flexible foamed polymer material, including: treating a former with a coagulant; dipping the treated former in a latex foam mixture to form a layer of the mixture on the former that includes air cells; curing the layer to gel the foam mixture to a cross-linked open cell structure; and stripping the layer from the former; where the latex foam mixture includes a natural latex polymer as a primary polymer component, and a synthetic latex polymer as a secondary polymer component, which synthetic latex polymer is selected to enhance the evenness and/or fineness of said open cell structure.

With optimum choice of the synthetic latex polymer, a very even open cell structure can be achieved that offers good insulation against both heat and cold and excellent sweat absorption. Advantageously, it is possible to achieve air content in the cured layer in the range 30-60%, more preferably in the range 45-55%. In this way, a higher than conventional air content can be achieved with optimal performance, thereby reducing the material cost of providing protection by way of the cured layer.

The synthetic polymer used is preferably a proprietary acrylic copolymer, a polyurethane polymer or a blend of both. The acrylic copolymer is advantageously an acrylic terpolymer. Preferably, the synthetic polymer is present in a proportion of the total of the primary and secondary polymer components in the range 2-10%, more preferably about 5-6%.

A second aspect of the invention concerns the surfactant package employed in the latex foam mixture. Typically, the latex foam mixture includes one or more latex polymers, for example the mix of primary and secondary polymer components of the first aspect of the invention, air bubbles injected into the mixture, and selected dispersion components. Such dispersion components may typically include a cure package such as zinc oxide/sulfur/selected dithiocarbamates or thiurams etc. for cross-linking, antioxidants for reduction of ageing, pigments and viscosity modifiers. A typical latex foam mixture further includes surfactant packages that, among other roles, are useful in stabilizing and sustaining the combination of latex polymer(s), air bubbles and dispersion components. It has been found, in accordance with a second aspect of the invention, that a particularly effective surfactant package for this purpose includes a pair of foam stabilizer sub-packages including a salt of a fatty acid soap and a protonated amine oxide.

Accordingly, the invention provides, in a second aspect, a process for producing an article in a flexible foamed polymer material, including: treating a former with a coagulant; dipping the treated former in a latex foam mixture to form a layer of the mixture on the former that includes air cells; curing the layer to gel the foam mixture to a cross-linked open cell structure; and stripping the cured layer from the former; wherein the latex foam mixture includes in combination one or more latex polymers, air bubbles and dispersion components, and further includes a surfactant package having a salt of a fatty acid soap and a protonated amine oxide for stabilizing and sustaining said combination. Preferably, the salt of a fatty acid soap is associated with a fatty alcohol, and the protonated amine oxide is associated with an anionic surfactant. It is thought that interaction occurs between the protonated amine oxide cation and the anion of the salt, where the cation and anion are very strongly hydrogen bonded via the $H^+$ of the cation. The same occurs for the fatty acid alcohol containing $OH^-$ groups to form hydrogen bonding with the anionic surfactant. Hence the nature of the polar group is significant in facilitating the formation of hydrogen bonding to increase the foam stability.

The surfactant package is found to be useful in optimizing air dispersion in the latex foam mixture. Preferably, in the latex foam mixture, and relative to a latex polymer content of 100 parts, the primary surfactant, e.g. a salt of a fatty acid soap, is present in the range of 1-2 parts, most preferably about 1.5 parts, and the secondary surfactant, the protonated amine oxide, is present in the range 0.5 to 1.5 parts, preferably about 1 part. The fatty alcohol and anionic surfactant are each preferably present in the range 0.5 to 1.5 parts, most preferably about 1 part.

By way of example, the salt may be the sulfated alkali metal salt of a long chain fatty acid such as lauryl acid or oleic acid, e.g. sodium or potassium lauryl sulphate. A suitable protonated amine oxide is lauryl dimethylamine oxide. The fatty alcohol may usefully then be lauryl myristyl alcohol, and the anionic surfactant may conveniently be sodium dodecylbenzene sulfonate.

The latex foam mixture will typically include one or more cross-linking activators, accelerators and/or agents to facilitate the gelation process. For maintaining the dispersion of these components, the surfactant package preferably further includes appropriate anionic stabilizers.

A third aspect of the invention relates to the dipping step and its effect on the subsequent curing process. In the aforementioned known process, the former is typically treated with a coagulant by first dipping the former into a tank containing the coagulant, most commonly an aqueous solution of calcium nitrate, and allowing it to dry on the former just prior to a first latex dip. Following this dip, the former, with a first layer of the latex mixture thereon, is leached in water tanks to extract excess calcium nitrate, leaving just enough present to coagulate the second latex layer in a following second latex dip. In accordance with a third aspect of the invention, it has been found advantageous to treat the former with the first latex layer already thereon with a strong coagulant solution immediately prior to the second dip.

It has also been found advantageous to incorporate into the foam latex a thixotropic agent which functions to allow easy flow during stirring and dipping but which increases the viscosity of the latex rapidly as soon as shearing (stirring in the tank and dipping) ceases, thereby allowing the foam latex to remain as a thick, even layer on the former until the former passes into the oven.

Accordingly, in the third aspect of the invention, there is provided a process for producing an article in a flexible foamed polymer material, including: treating a former with a coagulant; dipping the treated former in a latex foam mixture to form the layer of the mixture on the former that includes air cells; curing the layer to gel the foam mixture to a cross-linked open cell structure; and stripping the cured layer from the former; wherein said dipping is effected by dipping the treated former twice so as to form successive layers of an unfoamed latex and said latex foam mixture thereon, and wherein, after the first dip, the former with said unfoamed latex layer thereon is leached to remove excess coagulant and then treated with a relatively stronger coagulant to accelerate said gelation and to enhance bonding between said layers.

It is thought that the first layer should be unfoamed for greater tensile strength and durability. Said coagulant is conveniently calcium nitrate, and said leaching is preferably in water. The coagulant employed for the second treatment is preferably stronger by virtue of being more concentrated. The latex foam mixture is preferably rendered thixotropic by utilizing as a thixotropic agent a proprietary modified bentonite. If necessary, said cured layer is leached, preferably in water, to extract excess coagulant.

A fourth aspect of the invention concerns the control of the curing step. Essentially, the primary facet of the curing is a cross-linking reaction that converts the latex into a truly elastic film. During this process, several other changes must take place in correct sequence. As the cross-linking proceeds, the viscosity of the polymer increases rapidly and water evaporates. The walls of the air cells must rupture so that the open cell structure is formed, a desirable feature for sweat absorption and flexibility. However, it is preferred that the cell walls do not rupture too early or polymer viscosity will be still too low and the foam will collapse. In accordance with the fourth aspect of the invention, it is preferred that some of the air cells at the surface do collapse so that a thin film, preferably a very thin film of substantially solid latex, apart from perforations where the air bubbles were located, is formed. This film provides a suitable substantially continuous surface which may subsequently be treated, e.g. by chlorination and optionally leaching to reduce its permeability and/or friction and/or allergenicity. More particularly, in the fourth aspect of the invention, there is provided a process for producing an article in a flexible foamed polymer material, including: treating a former with a coagulant; dipping the treated former in a latex foam mixture to form a layer of the mixture on the former that includes air cells; curing the layer to gel the foam mixture to a cross-linked open cell structure; and stripping the cured layer from the former; wherein said curing is controlled whereby said cured layer with an open cell structure includes one or more surface films of substantially solid perforated latex. Preferably, said film(s) is treated to reduce its permeability and/or friction and/or allergenicity.

Preferably, the fourth aspect further includes controlling the dipping step to further facilitate the recited outcome. Advantageous control factors include the dip speed, and the air drying and heating profile, of ovens employed in the curing step. The said treatment of the film is advantageously by chlorination, e.g. by subjecting the cured and cooled layer while still on its former to an aqueous solution containing dissolved chlorine or a dissolved source of chlorine. Chlorine reacts with the latex film to form a surface of low permeability and low friction, and also denatures proteins by reacting with them and reducing their allergenicity. The treatment preferably further includes multiple subsequent leaching steps, e.g., with water at temperatures varying from 90-40° C. In this way, where the article is a glove or other item of apparel, it is possible to produce a chlorinated film surface which is adapted to easy donning (i.e., putting the gloves on and off).

Accordingly, in the fourth aspect of the invention, there is also provided a latex foam glove in which the interior contact surface of the glove is provided by a surface film of substantially solid perforated latex on an underlying layer of a cross-linked open cell structure, which surface film is unlined but treated to enhance its donnability and whereby the extractable protein level of the glove as measured by EN test method 455-33 is below 50 micrograms per gram of rubber preferably below 30 micrograms per gram of rubber. The extractable protein level is a recognized measure of allergenicity.

Preferably, in all of the above-described aspects of the invention, the latex foam mixture includes a thixotropic agent selected to maintain the aforesaid air bubbles in stable suspension so that they "freeze" in place on the former immediately on withdrawal of the former from said dip in the latex foam mixture. This stabilizes the foam after dipping and reduces dripping and/or runback of the foam before it can be cross-linked. A suitable thixotropic agent is bentonite or other modified silicate composition.

In a fifth aspect of the invention, there is provided a process for producing an article in a flexible foamed polymer material, including: treating a former with a coagulant; dipping the treated former in a latex foam mixture to form a layer of the mixture on the former that includes air cells; curing the layer to gel the foam mixture to a cross-linked open cell structure; and stripping the layer from the former; wherein the latex foam mixture includes a thixotropic agent selected to maintain air bubbles in stable suspension so that they freeze in place on the former immediately on withdrawal of the former from said dip in the latex foam mixture. Advantageously, in all aspects of the invention, after said dipping step and before the curing step, the former is turned over to allow the layer of latex foam mixture to smooth out and run over the surface of the former to enhance evenness of the coating.

Preferably, in all aspects of the invention, one or more curing and/or cross-linking agent(s) included in the latex foam mixture is or are selected to provide a relatively low sulfur containing cure package which enhances the proportion of mono-sulfidic cross-links, producing enhanced resistance to compression set and better recovery properties.

Preferably, in all aspects of the invention, for providing the air bubbles in the latex foam mixture, air is compressed and mixed with the aforementioned latex polymer or mixture of latex polymers, and then pumped into a mixing head which is rotating at high speed and thereby creating high shearing forces in order to ensure good mixing and creation of an even foam. The bubble size is adjustable by changing the shearing speed of the mixing head. The content of air can be varied in the range 0-70% by adjusting air pressure and flow. The proportion of air in the foam, i.e. the foam density, is advantageously controlled in order to control the viscosity of the foam during handling and dipping, and the thickness and final density of the cured layer of the article produced. The invention extends to any combination in a common process of one or more of the five aspects of the invention.

DETAILED DESCRIPTION

The invention will now be further described, by reference to an exemplary process, incorporating embodiments of all five aspects of the invention, for producing latex foam gloves.

A continuous sequence of glove formers, which may be left handed or right handed or ambidextrous, was first subjected to pre-cleaning in an acid bath. The cleaned formers were dipped in a first aqueous solution of a coagulant e.g. calcium nitrate at 250-300 g/l which was allowed to dry before the treated former was dipped into and withdrawn from a first tank of a prepared non-foaming latex mixture.

The resultant first latex layer, which was unfoamed latex rubber, formed the outside layer in the subsequent glove. The layer was leached in water tanks to extract excess calcium nitrate. In accordance with an embodiment of the third aspect of the invention, the layered former was now dipped into a strong aqueous solution of coagulant, typically again calcium nitrate but at 300-400 g/l. Both coagulant dips were at a temperature in the range 60-75° C. The coagulant was allowed to dry and the former, with its first unfoamed outer layer, was dipped into a tank of the latex foam mixture containing a bentonite-modified silicate as a thixotropic agent.

A suitable latex foam mixture is set out in Table 1. The latex foam mixture was maintained at a temperature in the region of 18-20° C. by using high displacement impellers to circulate the latex along the bottom of the tank past heat exchangers made from stainless steel dimple plate. The latex then rises past a battery of high speed whipping stirrers which assist in maintaining foam quality, and then across the surface of the latex in the tank at a speed similar to the speed of travel of the formers as they were passed through the tank.

After removal from this tank, with a second latex layer comprising the latex foam mixture that would be the liner of the subsequent glove, the former was turned over to facilitate an enhanced even coating of the second layer on the former, and then passed to the curing ovens. Here, the liner layer was cured to gel the layer to a cross-linked open cell structure. As the cross-linking proceeds, the viscosity of the polymer increases rapidly and water evaporates. The walls of the air cells must rupture so that the open cell structure is formed, a desirable feature for sweat absorption and flexibility. The dipping and curing were controlled so that the cured layer included a surface film of substantially solid latex, apart from perforations where the bubbles were located. In general, this control is achieved by setting appropriate dip line speeds according to the machine used but typically in the range of 4-14 ft/min, and oven temperatures in the range 95-155° C. These are adjusted to optimize the foam parameters.

After cooling by dipping in a water tank, the article, still on the former, was leached to remove excess calcium nitrate and then passed through water containing dissolved chlorine to 2000 ppm. The chlorine reacts with the aforementioned latex surface film to create a surface layer which has a lower permeability and a low friction, resulting in enhanced donnability. The chlorine also denatures proteins by reacting with them and reducing their allergenicity.

Following the chlorination treatment, the article was leached in water at temperatures in the range 90-40° C. several times, rinsed and then stripped from the former during which it was reversed to bring the first layer to the outside and to have the foamed layer as an inner liner, with the surface at the interior. There were then the usual further post treatments, including washing and drying.

The glove thus formed had excellent donning qualities and was found to have an extractable protein level as measured by EN test method 455-3 below 50 micrograms per gram of rubber. Typical extractable protein levels measured have been in the range 20 to 30 µg/gm of rubber.

TABLE 1

Composition of Latex Foam Mixture

| Type of Component | Component employed | Composition Range (% w/w) |
|---|---|---|
| Natural latex polymer | natural rubber (polyisoprene) | 90-98 |
| Synthetic latex polymer | acrylic terpolymer | 10-2 |
| Surfactant package | | |
| Salt of fatty acid soap | sodium lauryl sulfate | 1-2 |
| Protonated Amine oxide | lauryl dimethylamine oxide | 0.5-1.5 |
| Fatty Alcohol | lauryl myrstyl alcohol | 0.5-1.5 |
| Anionic surfactant | sodium dodecylbenzene sulfonate | 0.5-1.5 |
| Anionic stabilizers | Modified alkyl aryl sulfonate and sodium naphthalene sulfonate | 0.02-0.5 |
| Composition of Latex foam Mixture | | |
| Thixotropic agent | Bentonite-modified silicate | 1-3 |
| Conventional cross-linking agents and accelerators, foam promotors. Antioxidants, pigments and viscosity modifiers | | |

The invention claimed is:

1. A glove, comprising:
a cured unfoamed latex layer; and
a dipped cured foamed latex layer, comprising a mixture of natural latex polymer and a synthetic latex polymer and a bentonite, that is adhered to the cured unfoamed latex layer;
wherein the bentonite is effective to stabilize the foamed latex layer before curing occurs, and the cured foamed latex layer adhered to the cured unfoamed latex layer has an air content in the range of 30 to 60% by volume and an open cell structure.

2. The glove of claim 1, wherein the synthetic latex polymer is selected from the group consisting of an acrylic terpolymer, a polyurethane polymer and a blend of acrylic terpolymer and polyurethane polymer.

3. The glove of claim 1, wherein the synthetic latex polymer is present in a proportion of the total of the natural latex polymer and the synthetic latex polymer in the range of 2 to 10% by weight.

4. The glove of claim 1, wherein the synthetic latex polymer is present in a proportion of the total of the natural latex polymer and the synthetic latex polymer in the range of 5 to 6% by weight.

5. The glove of claim 1, wherein the air content in the cured foamed latex layer is in the range 45 to 55%.

6. The glove of claim 1, wherein the inner surface of the article comprises the cured foamed layer, which, when worn, contacts the skin.

7. The glove of claim 1, wherein an extractable protein level is no more than 50 micrograms per gram of rubber.

8. The glove of claim 1, wherein the thixotropic agent is bentonite.

9. The glove of claim 8 wherein the bentonite is present in the foamed latex layer in a range of 1-3% w/w.

10. The glove of claim 1 wherein the foamed latex layer further comprises a viscosity modifier.

11. The glove of claim 1 produced by a process comprising the steps of:
    forming an unfoamed latex layer on a former by treating the former with a first coagulant and dipping the former into a latex composition;
    treating the unfoamed latex layer on the former with a second coagulant that is more concentrated than the first coagulant;
    dipping the unfoamed latex layer in a stabilized latex foam comprising a mixture of natural latex polymer and a synthetic latex polymer and a thixotropic agent to form a gelled foamed latex layer on the unfoamed latex layer, wherein the foamed latex layer includes air cells; and
    heat curing to rupture the air cells, forming an open cell structure having an air content in the range of 30-60% by volume.

12. The glove of claim 11, wherein the latex foam is stabilized with a surfactant package comprising a salt of a fatty acid soap associated with a fatty alcohol and a protonated amine oxide associated with an anionic surfactant.

13. A method of making an article comprising a flexible foamed polymer, wherein the article comprises a glove and the method comprises the steps of:
    treating the unfoamed latex layer of claim 1 on a former with a coagulant, wherein the coagulant is more concentrated than a coagulant used to treat the former prior to formation of the unfoamed latex layer;
    dipping the former with the treated unfoamed latex layer in a stabilized latex foam to form a gelled foamed latex layer on the unfoamed latex layer, wherein the foamed latex layer includes air cells; and
    heat curing to rupture the air cells.

14. The method of claim 1, wherein the unfoamed latex layer is leached before treatment with the more concentrated coagulant.

15. The method of claim 1 wherein the more concentrated coagulant comprises calcium nitrate.

16. The method of claim 1 further comprising:
    forming the stabilized latex foam from a stabilized latex composition comprising a thixotropic agent and a surfactant;
    foaming the stabilized latex composition by providing air from a compressed air source, mixing the air with the stabilized latex composition to form a mixture, and pumping the mixture into a mixing head that is rotating at high speed to form a foam having substantially uniform air cells;
    dipping the unfoamed latex layer on the former in the foam to form a gelled foamed latex layer on the unfoamed latex layer, whereby the air cells freeze in place immediately upon withdrawal of the former from the foam and the gelled foamed latex layer comprises the substantially uniform air cells; and
    heat curing to substantially rupture the air cells without collapsing the foam.

17. The method of claim 1 wherein the stabilized latex foam comprises a salt of a fatty acid soap associated with a fatty alcohol and a protonated amine oxide associated with an anionic surfactant.

* * * * *